United States Patent Office 3,478,889
Patented Nov. 18, 1969

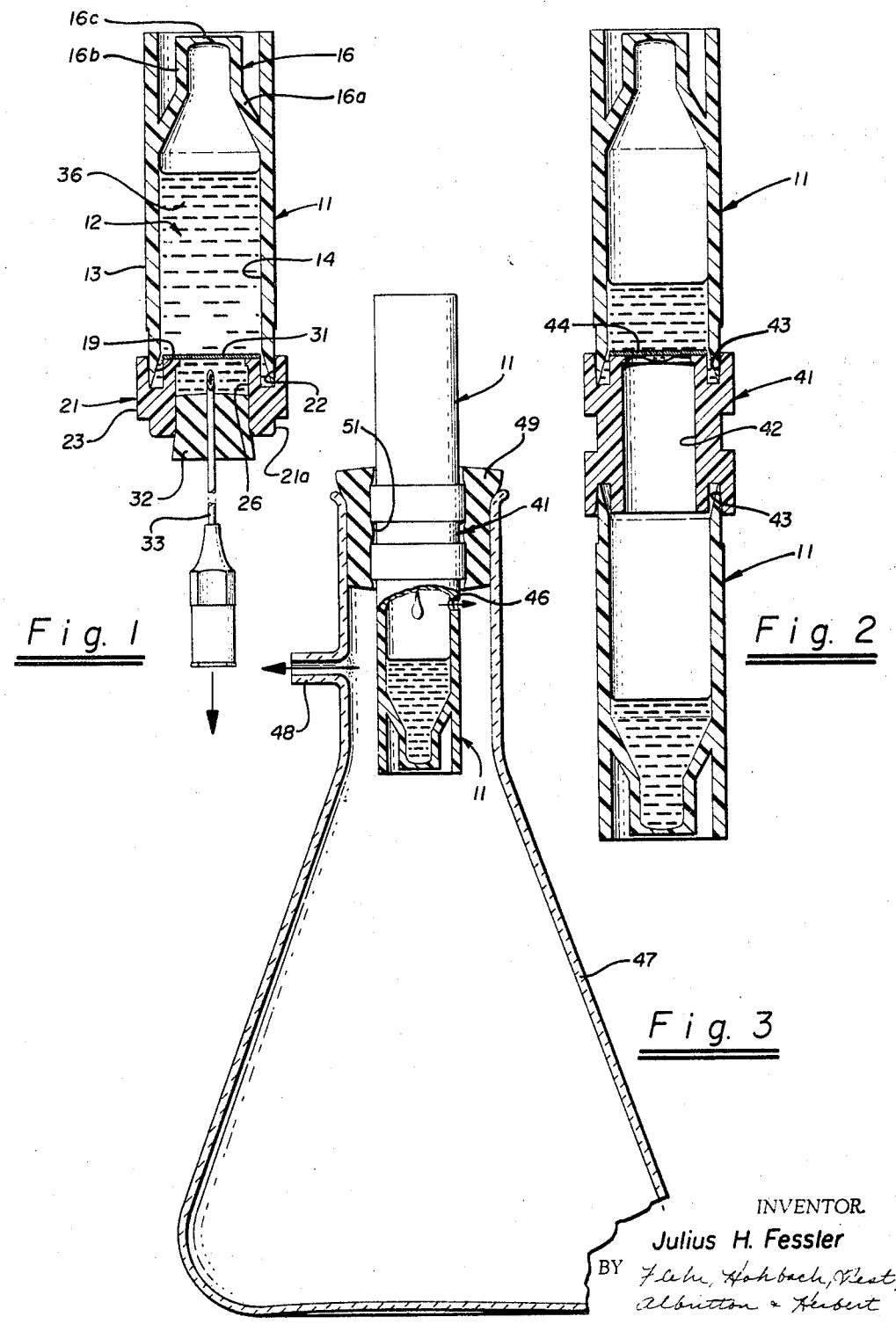

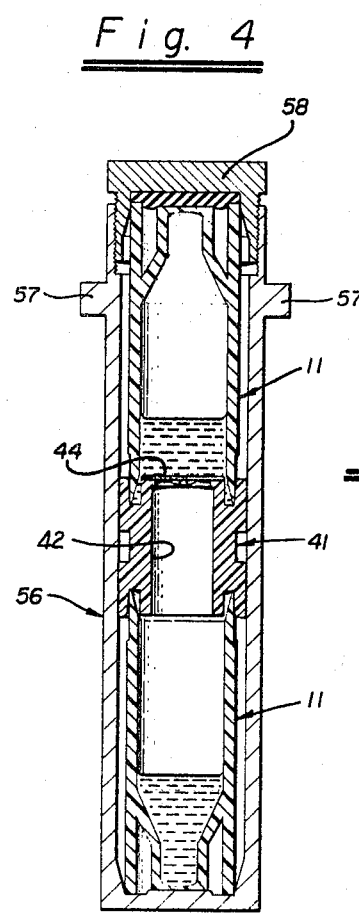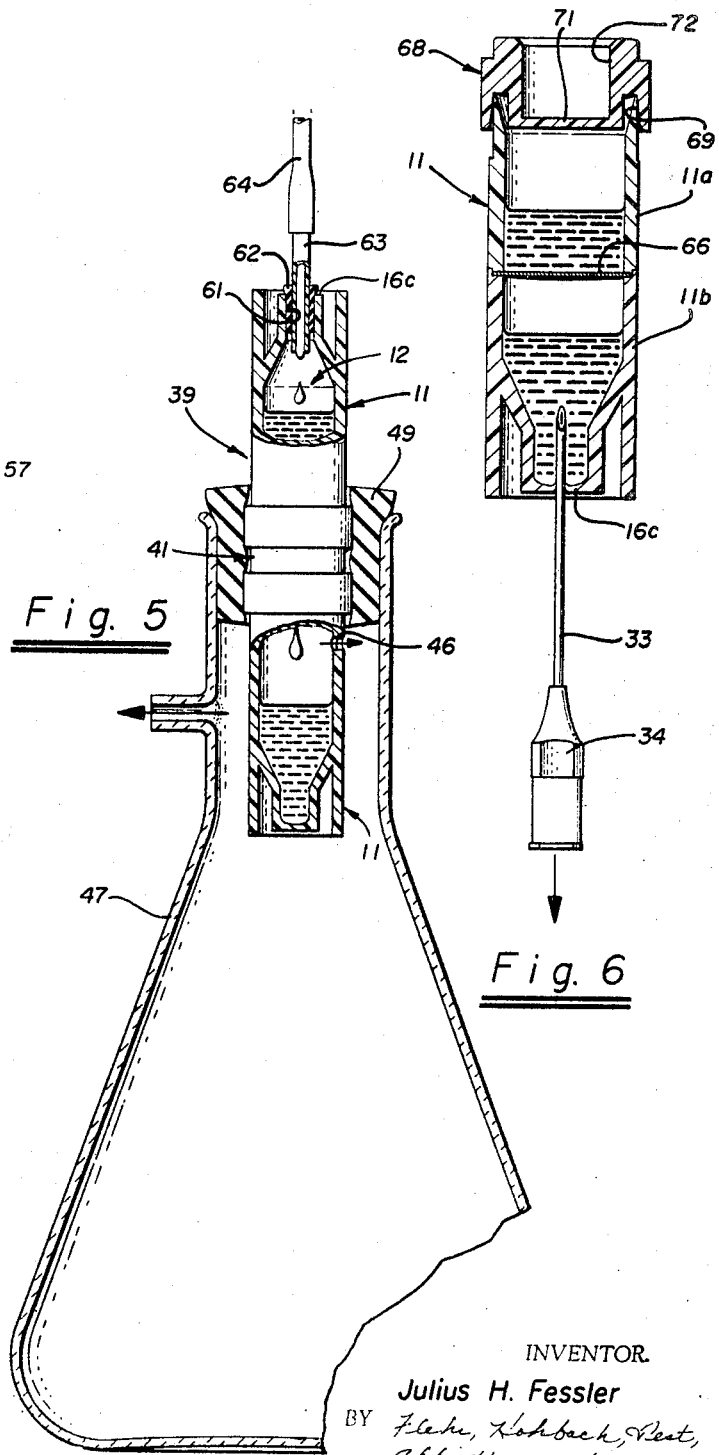

3,478,889
FILTER APPARATUS
Julius H. Fessler, Oakland, Calif., assignor of one-half to Albert P. Krueger, Berkeley, Calif.
Filed Aug. 31, 1967, Ser. No. 664,807
Int. Cl. B01d 27/08
U.S. Cl. 210—406         3 Claims

ABSTRACT OF THE DISCLOSURE

Filter apparatus comprising a body having a fluid chamber therein open on at least one end and a cap removably closing the open end, the cap having a passage therein with a filter pad mounted at one end of the passage for filtering fluid passing from the chamber and through said passage.

BACKGROUND OF THE INVENTION

Filter units and assemblies have heretofore been provided. However, in general, such filter assemblies have been of the non-disposable type. This is particularly true with respect to those which are used in conjunction with centrifuges. There is, therefore, a need for a disposable type filter apparatus which has many applications.

SUMMARY OF THE INVENTION

This invention relates to a filter apparatus of the type which is disposable. It consists of a body which has a chamber therein which is adapted to receive the fluid and which is open at one end. A cap is provided for closing the open end of the body. The cap is provided with a passage therein which is in communication with the chamber. A filter element or pad is mounted on the cap to prevent the passage of fluid through the cap until after it has passed through the filter element.

In general, it is an object of the present invention to provide a filter apparatus of the type which is disposable.

Another object of the invention is to provide a filter apparatus of the above character which can be utilized in a number of ways in different applications.

Another object of the invention is to provide a filter apparatus of the above character in which the filtrate can be readily obtained.

Another object of the invention is to provide a filter apparatus of the above character which is relatively inexpensive and which can be readily fabricated.

Additional objects and features of the invention will appear from the following description in which the preferred embodiments are set forth in detail in conjunction with the accompanying drawings.

BRIEF DESCRIPTION OF THE DRAWINGS

FIGURE 1 is a cross-sectional view of a filter apparatus incorporating the present invention.

FIGURE 2 is a cross-sectional view of another embodiment of the filter apparatus incorporating the present invention in which two separate bodies with fluid chambers therein are utilized.

FIGURE 3 is a cross-sectional view of another embodiment of the filter apparatus which includes a vacuum flask.

FIGURE 4 is a cross-sectional view of still another embodiment of the filter apparatus showing its use in a centrifuge apparatus.

FIGURE 5 is a cross-sectional view of another embodiment of the filter apparatus showing the manner in which the filter apparatus can be utilized for filtering relatively large quantities of fluid.

FIGURE 6 is a cross-sectional view of still an other embodiment of the filter apparatus.

DESCRIPTION OF THE PREFERRED EMBODIMENTS

The filter apparatus consists of a body 11 formed of a suitable material such as a molded plastic. The body 11 is provided with a fluid chamber 12. The body is provided with a cylindrical outer surface 13 which extends the length of the body and a cylindrical inner surface 14. One end of the chamber 12 is open, whereas the other end is closed in a suitable manner such as by an end portion or fitting 16 which, as shown in FIGURE 1, forms an integral part of the body 11. The end portion 16 is provided with a tapered or conical portion 16a, a cylindrical portion 16b and an end wall 16c. The outer surface of the end wall 16c is disposed within the outer extremity of one end of the body 11. The other end of the body 11 is provided with an outwardly inclined surface 19 on the inner side.

A cap or cover 21 is removably mounted on said other end of the body 11. The cap 21 is also formed of a suitable material such as plastic. The cap 21 is provided with an annular recess 22 which is adapted to receive said other end of the body so that a sealing relationship can be established between the cap 21 and said other end of the body. The cap is also provided with a cylindrical outer surface 23. It is also formed with an outer portion 21a of smaller diameter which has rounded corners. The cap 21 is provided with a passage 26 which extends therethrough and opens into the chamber 12 in the body 11 when the cap is in place.

Means is provided for filtering any fluid passing through the passage 26 in the cap 21 and consists of a filter pad or element 31 which is permanently secured to the cap 21 so that any fluid passing through the passage must flow through the filter pad or element. Thus, as shown, the filter pad or element 31 is secured to the cap at one end thereof so that all fluid passing from the body and through the passage is filtered by the filter pad or element 31. Thus, the filter pad or element 31 has its outer margin secured to the cap 21 by suitable means such as a cement so that all fluid passing from the chamber 12 into the passage 26 must pass through the filter element.

Means is also carried by the cap to permit withdrawal of fluid from the passage after it has passed through the filter element. In FIGURE 1, this means consists of a stopper 32 formed of a suitable material such as rubber which has been pushed into one end of the package and through which a hypodermic needle 33 can be inserted.

In using the filter assembly shown in FIGURE 1, the liquid 36 is placed in the chamber 12 of the body 11 when the body is positioned with its open end up. Thereafter, the cap 21 can be placed over the other end of the body to close the same. The desired quantity of the product or liquid within the chamber 12 can then be filtered by inserting a hypodermic needle 33 through the stopper 32 and withdrawing liquid from the passage 26 in the cap 21 which causes additional liquid to flow through the filter pad or element 31. With such a filter apparatus, it can be seen that the filtered liquid or filtrate can be transferred directly to the hypodermic syringe through the needle 33 without danger of contamination. After the filter apparatus has been used, the entire assembly can be thrown away. The filter element 31 is permanently secured to the cap 21. In addition, the parts forming the filter apparatus are relatively inexpensive and, therefore, can be disposed of after use.

In the embodiment of the filter apparatus shown in FIGURE 2, two of the bodies 11 are provided in which one of the bodies carries the product or liquid which is to be filtered and the other body carries the filtrate. Cap means 41 is provided for closing the open ends of the two bodies 11. The cap means 41 is provided with a passage 42 extending between the chambers 12 provided in the two bodies 11. The cap means 41 is formed with a pair of annular recesses 43 which are adapted to receive the ends of the bodies 11. A filter pad or element 44 is permanently affixed to one end of the cap means 41 and serves to close the passage 42 so that all fluid passing through the passage 42 must pass through the filter pad or element 44.

The filter apparatus shown in FIGURE 2 can be utilized for filtering relatively small quantities of fluid as, for example, 1 or 2 cc. As pointed out above, the fluid which is to be filtered is placed in one of the bodies 11, after which the cap means 41 is placed thereon. Thereafter, the additional body 11 is mounted on the other end of the cap means and the entire filter apparatus can be placed on the table with the last named body being placed on a support to permit the fluid to flow by gravity through the filter element 44 through the passage 42 into the chamber 12 of the lowermost body 11.

After the filtration has been completed, the filtrate can be withdrawn by removing the bottom body 11 from the cup means and using the filtrate for the desired purpose. Thereafter, the entire filter apparatus can be thrown away if desired. This is true because most all the parts are formed of inexpensive materials so that the filter apparatus can be thrown away after use.

When it is desired to speed up the filtration which can be accomplished with the filter apparatus shown in FIGURE 2, the filter apparatus can be modified as shown in FIGURE 3. As indicated therein, the lowermost body 11 is provided with an opening 46 adjacent the upper extremity thereof but below the cap means 41. The entire assembly is then mounted in a vacuum flask 47 of a conventional type and which is provided with an outlet 48 that is adapted to be connected to a source of vacuum. A large rubber stopper 49 is mounted in the neck of the vacuum flask. The stopper 49 is provided with a large hole 51 for receiving the filter apparatus shown in FIGURE 2 and for retaining the same in the neck of the bottle so that the hole 46 is below the stopper.

It can be seen that when a vacuum is applied to the outlet 48 of the vacuum flask 47 so that the same vacuum will be applied through the hole 46 to the chamber 12 in the lowermost body 11, this greatly increases the speed of filtration of the fluid through the filter element and into the chamber 12 of the lowermost body 11. After the filtration has been completed, the stopper 49 can be removed from the vacuum flask 47 and thereafter the lowermost body 11 can be removed from the cap means 41 and the filtrate obtained therefrom.

In FIGURE 4, it can be seen that the filter apparatus shown in FIGURE 2 can be mounted in a centrifuge cup or cage 56 of a conventional type which is provided with pivots 57 and a cap 58. In operation in the centrifuge, the product or fluid which is to be filtered is placed in the uppermost body 11 as viewed in FIGURE 5 and then during centrifuging, the fluid passes through the filter pad or element 44 into the chamber in the outer body 11. After the centrifuging has been completed, the filter apparatus can be removed from the cage 56 and the filtrate obtained by removing the lower body 11 from the cap means 41. In addition, with the arrangement shown, it can be seen that by centrifuging, the solids can be separated from the liquids. The filtrate would be in the lower body 11, whereas the solid would be deposited on the filter element 44 which could be readily removed merely by removing the cap means 41 from the upper body 11. This filter apparatus is also of a type which can be disposed of after use.

In the event it is desired to filter a relatively large quantity of a liquid by use of the relatively small disposable type filter apparatus herein disclosed, the filter apparatus 39 is mounted in the large rubber stopper 49 mounted in the neck of the flask 47 as shown in FIGURE 5 with the hole 46 below the stopper 49. A passage 61 is provided in the bottom wall portion 16c of the upper body 11 and a stopper 62 is mounted therein. A rigid tube 63 is mounted in the stopper 62 and has its lower end opening into the chamber 12 provided in the upper body 11. A flexible fluid supply tube 64 is connected to the rigid tube 63 and is provided for supplying additional fluid which is to be filtered to the filter apparatus 39. Thus, it can be seen that with the arrangement shown, additional fluid to be filtered can be supplied to the filter apparatus so that the filter apparatus can be used as a filter as long as the filter element or membrane 44 remains effective as a filter. It is possible to filter several times the quantity of fluid which can be contained by one of the bodies 11 by use of one of the relatively simple and inexpensive filter apparatuses hereinbefore described. When the chamber in the lower body 11 becomes nearly full, the additional fluid then will pass through the opening 46 into the bottom of the flask 47 to thereby permit any desired quantity of fluid to be filtered and to permit the filtrate to pass to the bottom of the flask 47. The filtrate can be poured from the bottom of the flask merely by removing the stopper 49 carrying the filter apparatus 39.

Another embodiment of the filter apparatus is shown in FIGURE 6 in which the body 11 of the filter apparatus has been cut into two parts 11a and 11b and in which the filter element or pad 66 is permanently mounted between the two sections and the two sections are permanently secured to each other by suitable means, such as cement, to provide a filter element which extends between the portion of the chamber provided in the part 11a and the portion of the chamber provided in part 11b so that fluid travelling from one part to the other must first travel through the membrane or filter element 66. A cap 68 similar to that hereinbefore described is provided. It has an annular recess 69 therein for receiving the upper end of the body 11. It is also provided with a wall 71 which closes one end of a bore 72 provided in the cap. The bottom wall 16c of the part 11b of the body 11 is formed of a material which can be penetrated by the hypodermic needle 33 so that the filtrate can be removed from the chamber below the filter pad 66. In this embodiment of the invention, the product or fluid which is to be filtered is placed in the body 11 after removal of the cap 68. The cap is then put in place and the material which filters through the membrane 44 can be drawn from the body 11 by suitable means such as by use of the hypodermic needle shown in FIGURE 2. After the filtrate has been removed, the entire filter apparatus can be thrown away.

It is apparent from the foregoing that there has been provided a new and improved filter apparatus which is relatively economical and inexpensive and which is of a type that can be thrown away after use.

I claim:

1. In a filter apparatus, a body having a fluid chamber therein and having an open end in communication with the chamber, a cap removably mounted on said body and closing said open end, said cap having a passage therein in communication with said chamber, a filter element, means permanently affixing said filter element to said cap to prevent the flow of fluid through and into said passage without passing through said filter element, means carried by said cap spaced a substantial distance from the filter element so that there is a space between said filter element and said means carried by said cap in communication with said passage; said means carried by said cap being formed to permit withdrawal of fluid after it has passed through said filter element and into said space and including an additional body secured to said cap, said additional body enclosing said space; one of said bodies receiving a liquid which is to be filtered and the other of said bodies receiving the liquid after it has passed through said filter element and through said passage in said cap, said additional body having an opening therein which opens into said space, and means for mounting said additional body to supply a vacuum to said space in said additional body.

2. In a disposable filter apparatus, first and second plastic bodies, each of said bodies having a chamber opening through one end of the body, cap means connecting said bodies into a unitary assembly, said cap means having a flow passage therein in communication with the chambers in said bodies, a filter element, means permanently securing said filter element to said cap means and serving to filter the fluid as it passes through said passage from one of said bodies to the other of said bodies, and means for supplying a vacuum to one of said bodies comprising a vacuum flask for mounting said first and second bodies, said second body being formed with an orifice in communication between the chamber in said second body and said flask.

3. In a disposable filter apparatus, first and second plastic bodies, each of said bodies having a chamber opening through one end of the body, cap means connecting said bodies into a unitary assembly, said cap means having a flow passage therein in communication with the chambers in said bodies, a filter element, means permanently securing said filter element to said cap means and serving to filter the fluid as it passes through said passage from one of said bodies to the other of said bodies, and a jacket for holding said first and said second bodies in a unitary assembly while utilizing the same on a centrifuge.

References Cited
UNITED STATES PATENTS

| | | | |
|---|---|---|---|
| 65,515 | 6/1867 | Spencer | 210—477 X |
| 2,110,237 | 3/1938 | Parsons | 210—361 X |
| 2,682,268 | 6/1954 | Ryan et al. | 210—445 X |
| 2,775,350 | 12/1956 | Jones | 210—477 X |

JAMES L. DECESARE, Primary Examiner

U.S. Cl. X.R.
210—361, 477